Jan. 17, 1928.
W. BRÜCKEL
1,656,418
ADJUSTABLE DEVICE
Filed Jan. 2, 1926
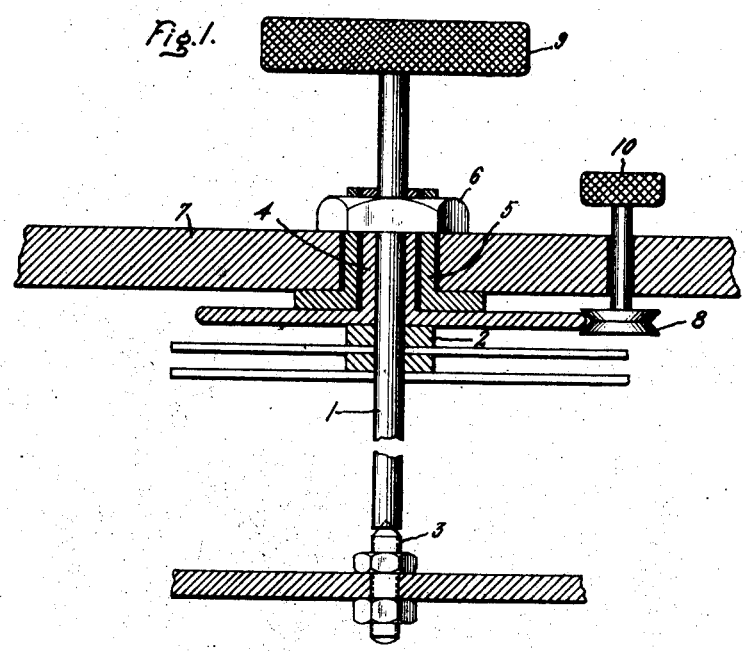
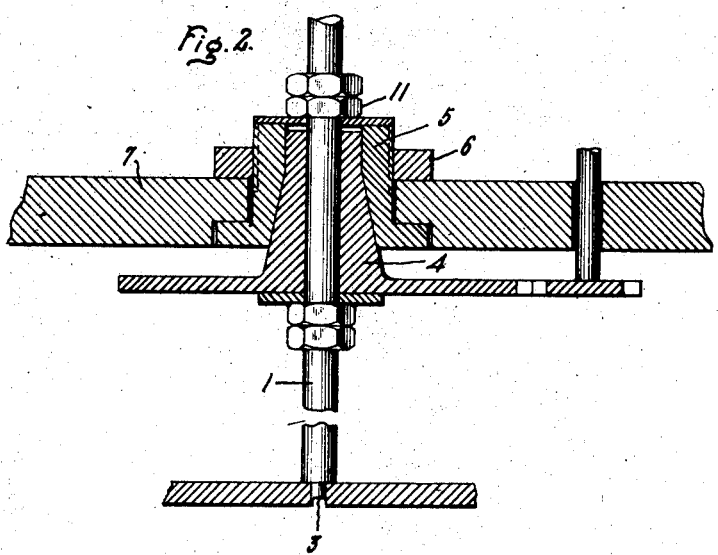
Inventor:
Waldemar Brückel,
by
His Attorney.

Patented Jan. 17, 1928.

1,656,418

UNITED STATES PATENT OFFICE.

WALDEMAR BRÜCKEL, OF BERLIN, GERMANY, ASSIGNOR TO GENERAL ELECTRIC COMPANY, A CORPORATION OF NEW YORK.

ADJUSTABLE DEVICE.

Application filed January 2, 1926, Serial No. 78,781, and in Germany January 30, 1925.

My invention relates to an adjusting device for the rotatable element for example of a condenser variometer or the like. In devices of this kind in which very fine adjustments are desired usually there is a preliminary rough adjustment after which the fine adjustment follows.

For example in adjustable condensers it is commonly the case that the rough adjustment is effected while the fine adjustment device remains inoperative. On the other hand, care must be taken to ensure an adequate coupling between the adjustment apparatus and the system to be adjusted. In the adjustment apparatus in rotary condensers hitherto known the fine adjustment apparatus has been connected with the shaft by a friction coupling which comprises a worm transmission which serves as a stopping gear or which is disengageably related to the condenser. The first arrangement has the disadvantage of being very complicated and necessitates specialized and expensive construction, while the latter involves the troublesome connection and disconnection of the fine adjustment element. In this case also the rough adjustment device generally suffers.

One of the objects of my invention is to overcome the disadvantages above indicated. When my invention is applied to a condenser the shaft which carries the condensing plates is not positioned directly in a customary journal box, but in an intermediate bearing rotatable in the fixed journal box. In my invention the friction turning moment between the shaft and the intermediate bearing is selected so as to be lower than the friction turning moment between the intermediate bearing and the fixed bearing. Consequently when the shaft revolves the intermediate bearing remains at rest while when the intermediate bearing revolves the shaft and with it are carried condenser plates.

In order to render possible an easy and convenient revolution of the intermediate bearing, this is provided with a circular disc or the like, which is coupled by friction or spur wheel with a smaller disc rotatable by means of an adjusting knob. The required difference in the two frictional turning moments can be obtained by various methods. Thus the middle friction power of the shaft can be made to operate on a smaller radius than that of the intermediate shaft, or the shaft is given the customary end bearing and the intermediate bearing, a conical bearing.

The means for accomplishing the foregoing are hereinafter more fully set forth and claimed, reference being had to the accompanying sheet of drawing in which two modifications of the invention are shown in longitudinal section.

According to Fig. 1 the adjusting ring 2 is fixed rigidly to the shaft and is pressed by the lower thrust bearing 3 against the intermediate bearing 4. The intermediate bearing 4 is provided with a disc and as is apparent from the drawing, positioned rotatably in the fixed bearing 5. The latter is held to the presser plate 7 by the nut 6. A small wheel 8 engages with the disc of the intermediate bearing 4. If now for the purpose of rough adjustment, the knob 9 belonging to the shaft 1 is turned, then owing to the friction condition selected the intermediate bearing 4, and with it the wheel 8 with knob 10, remains at rest. On the other hand, on the knob 10 being turned, the disc 4, and with it also the shaft 1, is moved with it. The disc 4 engages at the same time with its rounded circumference in a wedge-shaped groove of the wheel 8, whereby reliable friction is obtained.

The arrangement according to Fig. 2 has also a similar method of operation. The fixed bearing 5 has a conical boring which finally merges into a cylindrical boring. Into this boring a conical intermediate bearing 4 is then inserted. By means of a suitable selection of the friction angle the frictional turning moment between the fixed bearing 5 and the intermediate bearing 4 can be adjusted as desired. Instead of the thrust bearing an ordinary neck, bearing 3 is inserted. The necessary shaft pressure for the contemplated method of operating the intermediate bearing is in this case produced by a special screw nut 11 placed on the shaft.

It will be understood that while for the sake of clearness I have described my invention in connection with a specific embodiment I do not wish to be limited to the exact construction shown inasmuch as, in view of the disclosure, variations and modifications will be suggested which do not depart from the spirit of the invention or from the scope of the claims contained herein.

What I claim as new and desire to secure by Letters Patent of the United States, is:

1. An adjustable device comprising a shaft, a fixed bearing and an intermediate bearing journaled within the fixed bearing, said shaft being journaled in turn in the intermediate bearing, whereby the shaft may rotate within the intermediate bearing and the intermediate journal may rotate within the fixed bearing, the construction being such that the friction drag between the shaft and the intermediate bearing is less than that between the intermediate bearing and the fixed bearing so that when the shaft is directly rotated the intermediate bearing remains at rest while when the intermediate bearing is rotated the shaft is rotated together with the intermediate bearing.

2. In combination, a shaft, a fixed bearing, an intermediate bearing journaled in the fixed bearing and the shaft journaled in the intermediate bearing, means independent of the intermediate journal for rotating the shaft and means independent of the shaft for rotating the intermediate journal, the friction drag between the shaft and the intermediate bearing being different from that between the intermediate bearing and the fixed bearing whereby when the shaft is rotated directly the intermediate bearing is not rotated and when the intermediate bearing is operated directly the intermediate bearing and the shaft are rotated together.

3. In combination, a shaft, a fixed bearing, an intermediate bearing journaled in the fixed bearing and the shaft journaled in the intermediate bearing, means independent of the intermediate journal for rotating the shaft, and means independent of the shaft for rotating the intermediate journal, the friction drag between the shaft and the intermediate bearing being different from that between the intermediate bearing and the fixed bearing whereby when the shaft is rotated directly the intermediate bearing is not rotated and when the intermediate bearing is operated directly the intermediate bearing and the shaft are rotated together, said second means comprising a rotatable element independent of the shaft in driving engagement with the intermediate bearing.

4. An adjustable device comprising a shaft, a fixed bearing and an intermediate bearing journal within the fixed bearing, said shaft being journaled in the intermediate bearing, the shaft being mounted to rotate within the intermediate journal and the intermediate journal mounted to rotate within the fixed journal, the construction being such that the frictional turning moment between the shaft and the intermediate bearing is lower than that between intermediate bearing and the fixed bearing so that when the shaft is directly rotated the intermediate bearing remains at rest while when the intermediate bearing is rotated the shaft is rotated with the intermediate bearing, the bearing of the intermediate bearing being conical.

In witness whereof, I have hereunto set my hand this 10th day of December, 1925.

WALDEMAR BRÜCKEL.